Patented July 27, 1937

2,088,006

UNITED STATES PATENT OFFICE 2,088,006

INK

Elmer W. Zimmerman, Chevy Chase, Md., assignor to the Government of the United States No Drawing. Application September 20, 1935, Serial No. 41,478

6 Claims. (Cl. 134—37)

(Granted under the act of March 3, 1883, as amended April 30, 1928; 370 O. G. 757)

The invention described herein may be manufactured and used by or for the Government of the United States for governmental purposes without the payment to me of any royalty thereon.

The present invention relates to improvements in inks such as commonly employed as a writing fluid or the like. Inks employed as writing fluids usually contain tannic acid. Inks of this type have a low stability against sedimentation unless a relatively large amount of stabilizing acid is used which in turn causes excessive corrosion of steel pens.

One object of the invention is to provide a writing ink or fluid which has a greatly reduced corrosive effect upon steel writing pens or the like as compared with commercial writing inks or fluids of this type now commonly employed. This is accomplished by adjusting the ingredients, as provided hereinafter, so as to produce an ink that requires a much smaller quantity of stabilizing acid than has heretofore been used.

Another object of the present invention is to provide an ink or writing fluid which is highly stable against sediment formation. It has been found that inks containing tannic acid are less stable than inks that do not contain this material. According to my invention, tannic acid, therefore, has been eliminated and a greater quantity of gallic acid is used in lieu of the deficiency of the phenolic body due to the elimination of the tannic acid. The resulting combination produces an ink of greater stability.

A further object of my invention is that the ink can be manufactured and sold in either powder or liquid form.

Other objects relating to the properties of the materials employed and the preferred proportions of said materials will appear in the detailed specification to follow.

The powdered form of my ink can be worked out from a formula as follows:

| | Grams |
|---|---|
| Gallic acid ($C_7H_6O_5 \cdot H_2O$) | 10.0 |
| Ferrous sulphate ($FeSO_4 \cdot 7H_2O$) | 15.0 |
| Tartaric acid | 1.0 |
| Soluble blue (Colour Index #707) | 3.5 |

The completed or liquid form of my ink is produced by adding sufficient water to this formula to make one liter of ink.

It will be noted that all the ingredients named are solids which are not hygroscopic. The ratio of the gallic acid to the ferrous sulphate heptahydrate is fixed so as to form a definite compound without having an excess of one ingredient. A change in the quantity of ferrous sulphate heptahydrate necessitates a corresponding change in the quantity of the other.

A solid organic acid, preferably tartaric, is used as the stabilizing agent. Only a small quantity is necessary to greatly increase the keeping quality of the prepared ink.

The dye used is of little importance, since it acts only as an auxiliary coloring material. The particular dye employed has been found suitable, but any other dye can be used if it is soluble in the medium.

It should be noted that the formula above given contains a minimum amount of material to produce an ink that will meet all the necessary requirements of the Federal specification for writing ink.

I claim—

1. An ink composition consisting of the reaction products of gallic acid, ferrous sulphate heptahydrate, tartaric acid, a suitable coloring matter, and water, said gallic acid, ferrous sulphate heptahydrate and tartaric acid being substantially in the following proportions by weight per each liter of completed ink: gallic acid 10 grams; ferrous sulphate heptahydrate 15 grams; and tartaric acid 1 gram.

2. An ink composition consisting of the reaction products of gallic acid and ferrous sulphate heptahydrate substantially in the proportions by weight per each liter of completed ink of 10 grams and 15 grams respectively, a small quantity of tartaric acid as a stabilizer, water, and a small amount of a suitable dye as an auxiliary coloring matter.

3. An ink containing, as the sole reactive color forming compounds, gallic acid and ferrous sulphate in a quantity ratio of substantially 2 to 3 respectively.

4. An ink, the coloring matter of which is comprised substantially entirely of the reactive products of gallic acid and ferrous sulphate in a quantity ratio of approximately 2 to 3 respectively.

5. An ink containing, as the sole reactive color forming compounds, gallic acid and ferrous sulphate in a quantity ratio of substantially 10 to 15 respectively, and containing, as a reactive stabilizer forming compound, tartaric acid in a quantity ratio, with respect to the combined quantities of said gallic acid and ferrous sulphate, of approximately 1 to 25, respectively.

6. An ink, the coloring matter of which is comprised substantially entirely of the reactive products of gallic acid and ferrous sulphate in a quantity ratio of approximately 2 to 3 respectively, and the stabilizing matter of which is comprised substantially entirely of the reactive products of a small amount of tartaric acid in combination with the said gallic acid and ferrous sulphate.

ELMER W. ZIMMERMAN.